(12) United States Patent
Benhase et al.

(10) Patent No.: US 8,204,867 B2
(45) Date of Patent: Jun. 19, 2012

(54) APPARATUS, SYSTEM, AND METHOD FOR ENHANCED BLOCK-LEVEL DEDUPLICATION

(75) Inventors: Michael T. Benhase, Tuscon, AZ (US); Andrew D. Walls, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 337 days.

(21) Appl. No.: 12/511,827

(22) Filed: Jul. 29, 2009

(65) Prior Publication Data

US 2011/0029497 A1  Feb. 3, 2011

(51) Int. Cl.
*G06F 17/00* (2006.01)
(52) U.S. Cl. ........................................ 707/692
(58) Field of Classification Search .............. 707/692, 707/999.106
See application file for complete search history.

(56) References Cited

U.S. PATENT DOCUMENTS

| | | | | |
|---|---|---|---|---|
| 5,559,991 | A * | 9/1996 | Kanfi | 711/162 |
| 5,754,567 | A | 5/1998 | Norman | |
| 6,389,433 | B1 | 5/2002 | Bolosky et al. | |
| 7,103,602 | B2 | 9/2006 | Black et al. | |
| 7,921,086 | B1 * | 4/2011 | Bromley et al. | 707/692 |
| 2002/0169934 | A1 * | 11/2002 | Krapp et al. | 711/159 |
| 2003/0097359 | A1 | 5/2003 | Ruediger | |
| 2003/0105716 | A1 * | 6/2003 | Sutton et al. | 705/50 |
| 2005/0131939 | A1 * | 6/2005 | Douglis et al. | 707/103 Y |
| 2007/0174668 | A1 * | 7/2007 | Srinivasan | 714/6 |
| 2007/0255758 | A1 | 11/2007 | Zheng et al. | |
| 2008/0005141 | A1 | 1/2008 | Zheng et al. | |
| 2008/0016131 | A1 | 1/2008 | Sandorfi et al. | |
| 2008/0098083 | A1 | 4/2008 | Shergill et al. | |
| 2008/0155192 | A1 | 6/2008 | Iitsuka | |
| 2009/0204636 | A1 * | 8/2009 | Li et al. | 707/103 Y |
| 2009/0271402 | A1 * | 10/2009 | Srinivasan et al. | 707/6 |
| 2009/0287901 | A1 * | 11/2009 | Abali et al. | 711/206 |
| 2009/0319585 | A1 * | 12/2009 | Gokhale | 707/205 |
| 2010/0077013 | A1 * | 3/2010 | Clements et al. | 707/822 |
| 2010/0094817 | A1 * | 4/2010 | Ben-Shaul et al. | 707/697 |
| 2010/0299490 | A1 * | 11/2010 | Attarde et al. | 711/162 |
| 2010/0318759 | A1 * | 12/2010 | Hamilton et al. | 711/171 |
| 2011/0016152 | A1 * | 1/2011 | Popovski et al. | 707/797 |
| 2011/0082998 | A1 * | 4/2011 | Boldy et al. | 711/173 |

OTHER PUBLICATIONS

In-line or post process de-duplication? (updated Jun. 2008), W. Curtis Preston, Friday, Aug. 24, 2007.*
Curtis Preston. In-line or post-process de-duplication Aug. 24, 2007.

* cited by examiner

*Primary Examiner* — John R. Cottingham
*Assistant Examiner* — Mohammed R Uddin
(74) *Attorney, Agent, or Firm* — Kunzler Needham Massey & Thorpe (57) ABSTRACT

An apparatus, system, and method are disclosed for enhanced block-level deduplication. A computer program product stores one or more express block signatures in an express directory that meet a reference count requirement. The computer program product also stores one or more primary block signatures and one or more reference counts for the primary block signatures in a primary directory. Each primary block signature has a corresponding reference count. The computer program product determines whether a block signature for a data block matches one of the one or more express block signatures stored in the express directory.

20 Claims, 5 Drawing Sheets

APPARATUS, SYSTEM, AND METHOD FOR ENHANCED BLOCK-LEVEL DEDUPLICATION

BACKGROUND

1. Field

This invention relates to deduplication and more particularly relates to enhanced block-level deduplication.

2. Description of the Related Art

The amount of stored data is growing at an enormous rate. A large storage system commonly has as much as 3,000 petabytes (1024 terabytes) that grows by about 30% a year. Furthermore, many copies of data typically exist on a storage system, giving rise to methods to compress or to eliminate duplicate copies of this extra data to improve the capacity of the storage system. Such methods are commonly referred to as deduplication.

Deduplication at the data block level is difficult because there is no knowledge of the file name, structure, or application and therefore no way to imply or check supposed duplication of said files. Block-level deduplication requires a large amount of processing to individually compare the blocks for duplicates by reading and comparing sectors of data to see if the sectors are identical. A system may read blocks of data and compute some sort of a signature of the block and determine if multiple blocks have the same signature. If signatures match, the system may perform a bit by bit compare of the data blocks and determine if there is actual duplication of blocks.

The most efficient deduplication will occur with the smallest block size. However, the smaller the block size, the larger the directory of indexes to the signatures of each block. A large directory requires a large amount of storage to contain the directory and more processing resources to search the directory. Furthermore, due to the resource intensive nature of deduplication at the block-level, background processes of a storage system will often perform the signature comparing and the bit by bit comparing. Moreover, these background processes consume valuable resources of the storage system.

BRIEF SUMMARY

From the foregoing discussion, it should be apparent that a need exists for an apparatus, system, and method for enhanced block-level deduplication. Beneficially, such an apparatus, system, and method would expedite deduplication before data blocks are written to the storage device.

The present invention has been developed in response to the present state of the art, and in particular, in response to the problems and needs in the art that have not yet been fully solved by currently available deduplication solutions. Accordingly, the present invention has been developed to provide an apparatus, system, and method for enhanced block-level deduplication that overcome many or all of the above-discussed shortcomings in the art.

A computer program product comprising a computer readable storage medium having computer usable program code executable by a processor to perform operations is presented for enhanced block-level deduplication. The computer program product stores one or more express block signatures, stores one or more primary block signatures, and determines whether a block signature matches one of the one or more express block signatures stored in the express directory.

The computer program product includes storing one or more express block signatures in an express directory that meet a reference count requirement. The computer program product also stores one or more primary block signatures and one or more reference counts for the primary block signatures in a primary directory. Each primary block signature has a corresponding reference count. The computer program product determines whether a block signature for a data block matches one of the one or more express block signatures stored in the express directory as the data block is received by a storage device.

In one embodiment, the computer program product directs the storage device to store the data block in response to the block signature failing to match the one or more express block signatures stored in the express directory. Furthermore, in another embodiment, the computer program product determines whether the data block matches a stored data block associated with a matched express block signature in response to the block signature matching one of the one or more express block signatures.

In one embodiment, the computer program product directs the storage device to store a pointer to the stored data block in response to the data block matching the stored data block. The computer program product also increments a reference count associated with a block signature corresponding to the stored data block. In some embodiments, the computer program product directs the storage device to store the data block in response to the data block failing to match the stored data block.

In one embodiment, the computer program product promotes a block signature to the express directory in response to a reference count associated with the block signature meeting the reference count requirement. In another embodiment, the computer program product computes the block signature of the data block as the data block is received by a storage device. In some embodiments, storing one or more express block signatures in an express directory further includes adjusting the reference count requirement in response to an express directory size meeting a predetermined threshold.

The apparatus for enhanced block-level deduplication is provided with one or more modules that include an express directory module, a primary directory module, a block signature module, and a signature comparison module. The express directory module stores one or more express block signatures in an express directory that meet a reference count requirement. The primary directory module stores one or more primary block signatures and one or more reference counts for the primary block signatures in a primary directory. Each primary block signature has a corresponding reference count. The block signature module computes a block signature of a data block as the data block is received by a storage device. The signature comparison module determines whether the block signature for the data block matches one of the one or more express block signatures stored in the express directory.

The apparatus, in one embodiment, includes a block storage module that directs the storage device to store the data block in response to the block signature failing to match the one or more express block signatures stored in the express directory. In another embodiment, the apparatus includes a block comparison module that determines whether the data block matches a stored data block associated with a matched express block signature in response to the block signature matching one of the one or more express block signatures.

In a further embodiment, the apparatus includes a reference storage module that directs the storage device to store a pointer to the stored data block in response to the data block matching the stored data block. Furthermore, the apparatus includes a reference count module that increments a reference count associated with a block signature corresponding to the stored data block. In addition, the block storage module further directs the storage device to store the data block in response to the data block failing to match the stored data block.

In one embodiment, the apparatus includes a promotion module that promotes a block signature to the express directory in response to a reference count associated with the block signature meeting the reference count requirement. In another embodiment, the express directory module further includes an adjustment module that adjusts the reference count requirement in response to an express directory size meeting a predetermined threshold.

A method of the present invention is also presented for enhanced block-level deduplication. The method in the disclosed embodiments substantially includes the steps necessary to carry out the functions presented above with respect to the operation of the described apparatus and system. In one embodiment, the method includes storing one or more express block signatures in an express directory that meet a reference count requirement. The express directory is implemented on memory. The method includes storing one or more primary block signatures and one or more reference counts for the primary block signatures in a primary directory wherein each primary block signature has a corresponding reference count. The method also includes computing the block signature of the data block as the data block is received by a storage device so long as resource usage of the storage device is below a resource threshold. Finally, the method includes determining by a computer whether a block signature for a data block matches one of the one or more express block signatures stored in the express directory.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. Where a module or portions of a module are implemented in software, the software portions are stored on one or more computer readable media.

Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well known structures, materials, or operations are not shown or described in detail to avoid obscuring aspects of the invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
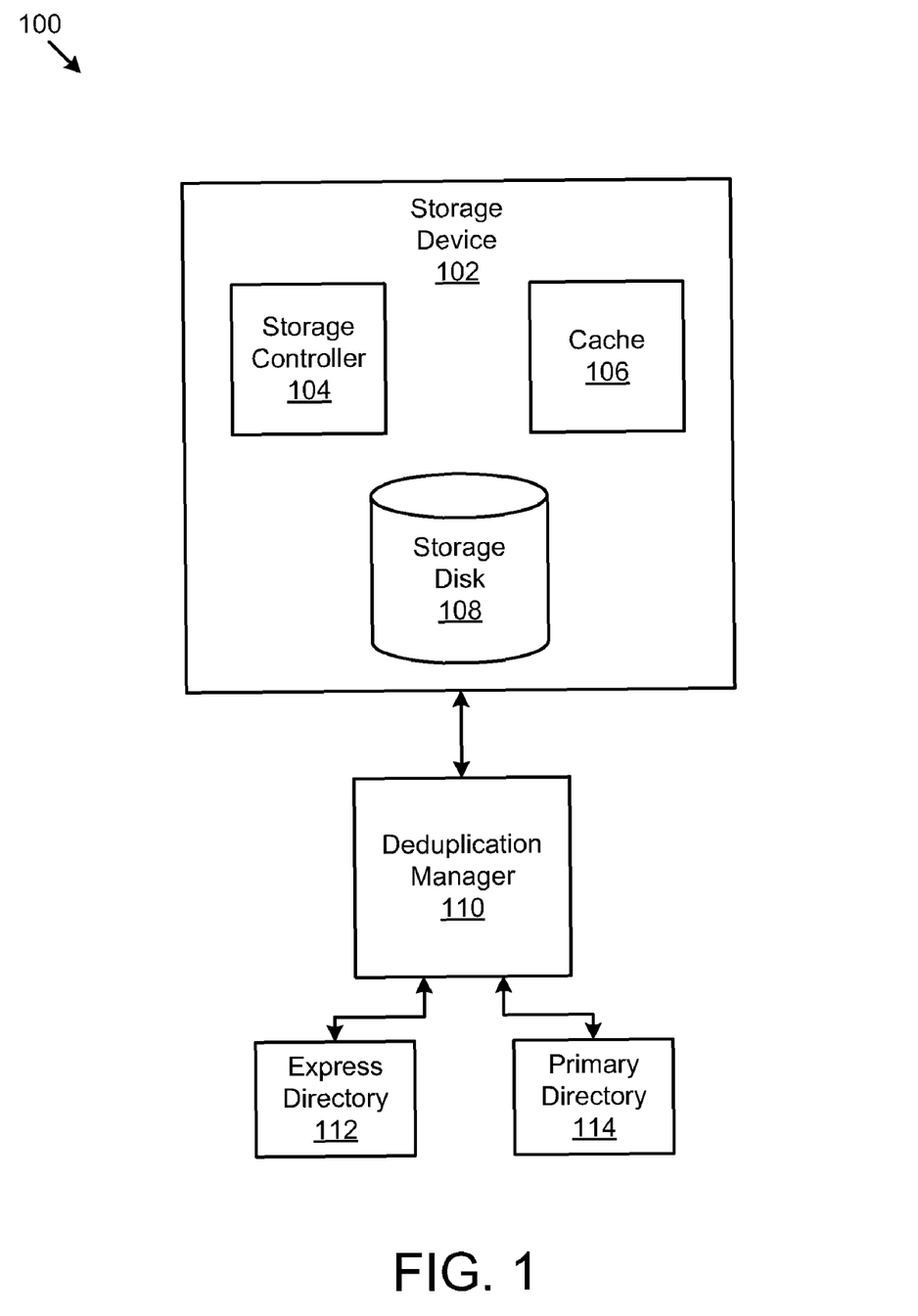
FIG. 1 is a schematic block diagram illustrating one embodiment of a system for enhanced block-level deduplication in accordance with the present invention.

FIG. 1 illustrates a system 100 for enhanced block-level deduplication. The system includes a storage device 102 with a storage controller 104, a cache 106 and a storage disk 108. The system also includes a deduplication manager 110, an express directory 112, and a primary directory 114. The storage device 102 may comprise a computing device, including a server, a mainframe, a desktop computer, a tablet computer, a PDA, and the like. Furthermore, the storage controller 104 may comprise a combination of hardware and software for operating the storage device 102. The storage controller 104 may include one or more processors and a memory.

The cache 106 may comprise non-volatile storage such as a hard disk drive or CD ROM drive, flash memory, and a random access volatile memory (RAM). Likewise, the storage disk 108 may comprise non-volatile storage such as a hard disk drive, CD ROM drive or flash memory. Within the storage device 102, a system bus may operably interconnect the storage controller 104, a cache 106 and storage disk 108.

The deduplication manager 110 is in communication with the storage device 102 using a communication media such as, but not limited to, a network like a LAN, a plurality of LANs, a localized intranet, or a direct connection such as a communication bus or cable connection like a serial or parallel cable connection. The deduplication manager 110 may comprise a computing device including a server, a mainframe, a desktop computer, a tablet computer, a PDA, and the like. Furthermore, in one embodiment, the deduplication manager 110 resides in the storage device 102 or as part of the storage controller 104.

In addition, the deduplication manager 110 is also in communication with an express directory 112 and a primary directory 114 through a communication media such as those described above in relation to the communication media between the deduplication manager 110 and the storage device 102. In some embodiments, the express directory 112 and primary directory 114 reside in the deduplication manager 110 or in the storage device 102 such as part of the cache 106.

The deduplication manager 110 computes a block signature for a data block as the data block is received by the storage device 102 and compares the block signature with block signatures for most widely used blocks, thereby relieving background processes from the entire burden of computing and comparing block signatures and expediting the signature comparing process. A block signature refers to a bit string that results from a function performed on a block of data. The block signature changes if the data in the block of data changes. The block signatures may include hash-based signatures such as Secure Hash Algorithm-1 (SHA-1) signatures or other data signatures as known in the art. Hash-based signatures result from hash functions that may take a variable length string and compute a fixed length hash value.

The deduplication manager 110 stores the block signatures that the deduplication manager 110 computes in the express directory 112 and in the primary directory 114. The express directory 112 stores the block signatures for the most redundant blocks. The express directory 112, in a preferred embodiment, is implemented on high speed memory such as non-volatile flash memory or volatile memory such as RAM. Therefore, the block signatures of the blocks most likely to be duplicated can be quickly referenced against incoming blocks while the data blocks are in the cache 106, before the data blocks are even written to the storage disk 108.

In one embodiment, once a block signature for a received data block matches a block signature stored in the high speed express directory 112, the deduplication manager performs a bit by bit comparison between the received data block and the stored data block associated with a matched block signature before the received data block is written to storage disk 108. If the bit by bit comparison yields an exact match, the deduplication manager 110 directs the storage device 102 to store a pointer to the stored data block instead of the data block itself. Therefore, redundant memory blocks are successfully deduplicated before even being written. In another embodiment, once the deduplication manager 110 has performed a successful block signature comparison, the bit by bit comparison is performed with a background process after the received data block has been written to storage disk 108.

The primary directory 114 records the exact reference count per given block signature, the storage location of the data block associated with the block signature, and whether a pointer to another block is stored at the location or the data block itself. Furthermore, the primary directory 114 may be implemented on a hard disk drive or CD ROM drive, flash memory, and RAM.

Figure 2:
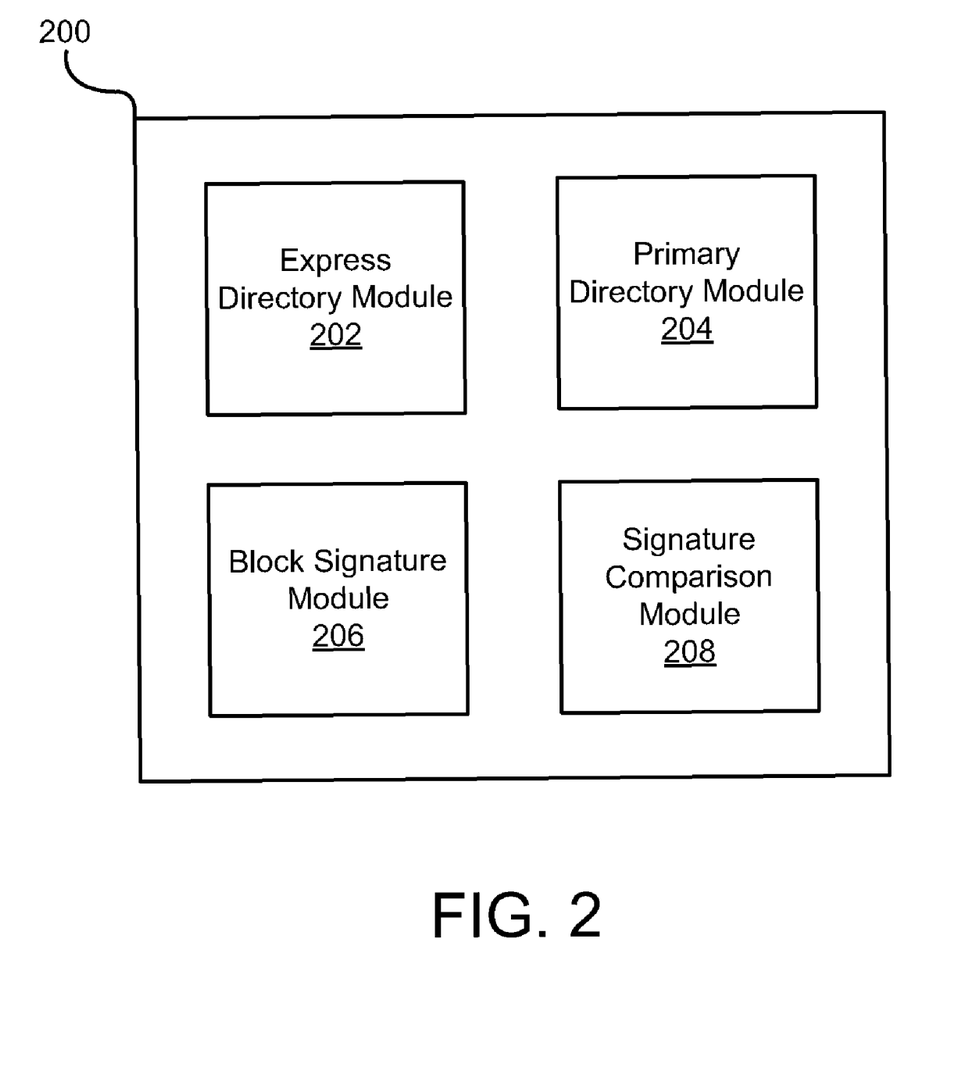
FIG. 2 is a schematic block diagram illustrating one embodiment of an apparatus for enhanced block-level deduplication in accordance with the present invention.

FIG. 2 illustrates one embodiment of an apparatus 200 for enhanced block-level deduplication. The apparatus 200 may comprise on embodiment of the deduplication manager 110. The apparatus 200 includes an express directory module 202, a primary directory module 204, a block signature module 206, and a signature comparison module 208.

The express directory module 202 stores one or more express block signatures in the express directory 112. As used herein, an express block signature is a block signature stored in the express directory 112 for fast access. As mentioned above, the express directory 112 may be implemented on high speed memory for faster access and faster searches through the express signatures. Because the most efficient deduplication occurs with the smallest block size, a larger directory is required to store a larger number of block signatures generated from using a smaller block size. Therefore, the express directory 112 may be stored in relatively fast access memory so that a search of the express directory 112 is as quick as possible.

In one embodiment, the express directory module 202 determines the size of the express directory 112 by the total amount of available high speed memory in the storage device 102 or another computing device. For example, if 64 gigabytes ("GB") of memory is available, the express directory module 202 may limit the size of the express directory 112 to no larger than a certain percentage of total memory. If the size limit is set to 1% of the total size and a directory entry is 8 bytes of address and 4 bytes of reference count and flags, the express directory 112 could store 57 million directory entries.

The express directory 112 stores the entries for the block signatures with the largest reference count. Therefore, the express directory 112 stores the express block signatures that meet a reference count requirement. The reference count requirement may comprise a minimum number of references or pointers to the data block associated with the block signature in order for the block signature to be stored in the express directory. For example, if a particular data block has two pointers referencing the data block and the reference count requirement is three, the particular data block will not be stored in the express directory 112. If, however, the reference count requirement is two, the particular data block will appear in the express directory 112.

In one embodiment, the reference count requirement is set to an initial value. Furthermore, the size of the express directory 112 may be controlled by the reference count requirement. As explained below, in order to keep the express directory 112 at a certain size, the reference count requirement may increase over time, thereby decreasing the amount of block signatures eligible for inclusion in the express directory 112 and regulating the size of the express directory 112.

The primary directory module 204 stores one or more primary block A signatures and one or more reference counts for the primary block signatures in a primary directory 114. Each primary block signature has a corresponding reference count. As used herein, a primary block signature comprises a block signature stored in the primary directory 114. Furthermore, in one embodiment, the primary directory 114 stores reference counts for every block signature computed by the block signature module 206 discussed below.

Furthermore, as stated above, in one embodiment, the primary directory 114 also stores the storage location of the data block associated with the block signature and whether the data block is stored at the storage location or a pointer to another data block.

The block signature module 206 computes a block signature of a data block as the data block is received by a storage device 102 and written to the cache 106 of the storage device 102. The block signature module 206 may compute the block signature with a SHA-1 or other signature computer.

In one embodiment, the block signature module 206 computes the block signature of the data block as the storage device 102 receives the data block so long as resource usage of the storage device 102 or block signature module 206 is below a resource threshold. A resource threshold, in one embodiment, is an indicator or measure of the rate at which the storage device 102 or block signature module 206 is consuming resources and processing power. For example, if the storage device 102 is receiving or processing a large amount of data and computing block signatures while the storage device 102 is receiving data would impede performance of the storage device 102, the block signature module 206 may stop computing block signatures before the data blocks are written to storage disk 108. The block signature module 206 may also stop computing the block signature of every block received by the storage device 102 and instead compute the block signature for every N number of received blocks.

In one embodiment, the block signature module 206 computes the block signature of data blocks that the storage device 102 has already written to storage disk 108 using a background process, or a process independent of the processes involved with receiving and storing incoming data. The block signature module 206, in one embodiment, track the data blocks that lack a corresponding block signature and computes the block signature in the background. For example, if the block signature module 206 failed to compute a block signature for a particular data block because the resource usage of the device 102 or block signature module 206 exceeded a resource threshold at the time the particular data block was received by the storage device 102, the block signature module 206 may add the particular data block to a queue for later block signature computation.

The signature comparison module 208 determines whether the block signature for the data block matches one of the one or more express block signatures stored in the express directory 112. In one embodiment, the signature comparison module 208 compares the block signature to the express block signatures as the storage device 102 receives the data block and before the storage device 102 writes the data block to storage disk 108. Because the express directory 112 is implemented on high speed memory, the signature comparison module 208 may compare the block signatures without impeding data flow.

Furthermore, in one embodiment, the signature comparison module 208 operates as a background process to make signature block comparisons that were not performed when data blocks were received by the storage device 102 and before the data blocks were written to storage disk 108. For example, if the signature comparison module 208 failed to compare a block signature for a particular data block because the resource usage of the storage device 102 exceeded a resource threshold at the time the particular data block was received by the storage device 102 or if the block signature was never computed as the data block was received for similar reasons, the signature comparison module 208 may perform signature block comparisons in the background. Therefore, the signature comparison module 208 may perform additional deduplication functions after the storage device 102 has written data blocks to storage disk 108.

As will be described hereafter, the block signature may still match a primary block signature as not all block signatures are stored in the express directory 112. Therefore, in one embodiment, the signature comparison module 208 compares primary block signatures as part of a background process. The signature comparison module 208 may thereby perform additional "clean-up" deduplication on the block signatures not duplicated as often as the block signatures stored in the express directory 112.

Figure 3:
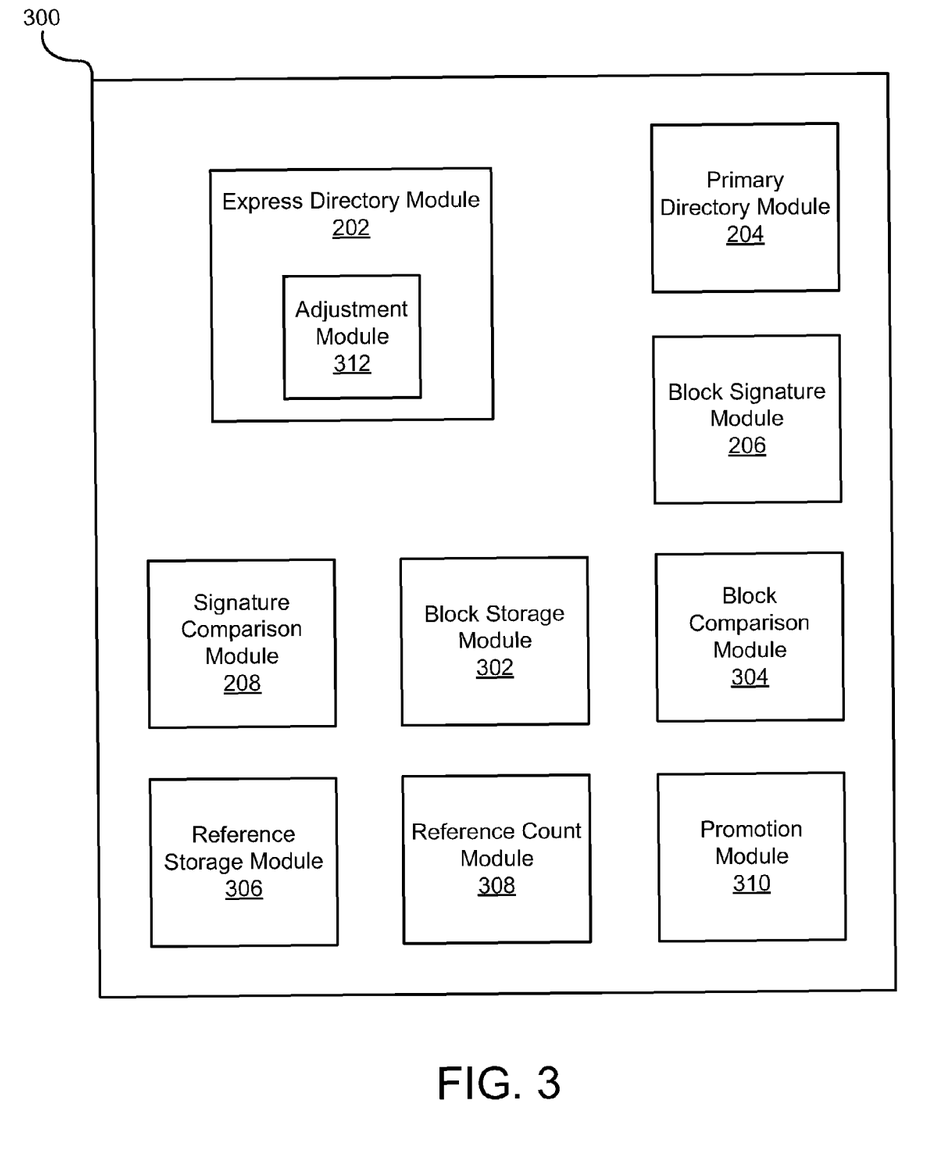
FIG. 3 is a detailed schematic block diagram illustrating one embodiment of an apparatus for enhanced block-level deduplication in accordance with the present invention.

FIG. 3 illustrates another embodiment of an apparatus 300 for enhanced block-level deduplication. The apparatus 300 may comprise one embodiment of the deduplication manager 110. The apparatus 300 includes the express directory module 202, the primary directory module 204, the block signature module 206, and the signature comparison module 208 as described above in connection with FIG. 2. FIG. 3 also illustrates a block storage module 302, a block comparison module 304, a reference storage module 306, a reference count module 308, a promotion module 310, and an adjustment module 312.

The block storage module 302 directs the storage device 102 to store the data block in response to the block signature failing to match the one or more express block signatures stored in the express directory 112. If the block signature fails to match an express block signature from the express directory 112, the data block represented by the block signature is not a duplicate of the more widely used data blocks. Therefore, no further comparisons are required before the data block is stored. In one embodiment, the block storage module 302 adds the block signature to the primary directory 114.

In addition, the block storage module 302, in one embodiment, directs the storage device 102 to store the data block in response to the data block failing to match the stored data block. As will be described hereafter, once a block signature matches an express block signature, a detailed, bit by bit comparison determines if the data block associated with the block signature is identical to the data block associated with the express block signature. If the data blocks fail to match, the blocks are not duplicates and the storage device 102 may save the entire data block. If the storage device 102 has written the data block to the cache 106, the block storage module 302 directs the storage device 102 to store the data block by allowing the storage device 102 to write the data block from the cache 106 into storage disk 108.

The block comparison module 304 determines whether the data block matches a stored data block associated with a matched express block signature in response to the block signature matching one of the one or more express block signatures. The matched express block signature comprises a block signature from the express directory 112 that matches the block signature associated with the received data block. Furthermore, the stored data block is a data block that is already stored on the storage device 102. In one embodiment, the block comparison module 304 performs a detailed comparison, such as a bit by bit comparison, of the data block and the stored data block. Although two block signatures may be identical, the data blocks corresponding to the block signatures are not necessarily identical. Therefore, a detailed comparison of the blocks is needed to verify duplication. As is known in the art, a bit by bit comparison may compare two segments of data to test for an exact match by comparing the data segments at the bit level.

In one embodiment, the block comparison module 304 compares a data block with a stored data block while the data block is located in the cache 106, and has not yet been written to storage disk 108. In another embodiment, the block comparison module 304 compares a data block after it has been written to storage disk 108. In this embodiment, the block comparison module 304 may use a background process.

The reference storage module 306 directs the storage device 102 to store a pointer to the stored data block in response to the data block matching the stored data block. In one embodiment, the reference storage module 306 directs the storage device 102 to store a pointer to the stored data block by replacing the data in the cache 106 with a pointer. Therefore, when the storage device 102 writes the cache 106 to storage disk 108, the pointer is stored in place of the actual block. This will result in less cache 106 space being utilized and therefore less data being written to storage disk 108. In one embodiment, the reference storage module 306 also runs as a background process to replace data blocks that already exist in storage disk 108 with pointers to other data blocks as part of the "clean up" deduplication.

The reference count module 308 increments a reference count associated with a block signature corresponding to the stored data block. The reference count, in one embodiment, is located in the primary directory 114. Furthermore, each block signature in the primary directory 114 has a reference count. Once a data block is identified as being a match with another data block and a pointer is stored, the reference count module 308 increments the reference count to reflect the additional reference to the stored data block.

The promotion module 310 promotes a block signature to the express directory 112 in response to a reference count associated with the block signature meeting the reference count requirement. The reference count indicates how often the data block associated with the reference count occurs. Therefore, the promotion module 310 ensures that the data blocks that are duplicated the most often appear in the express directory 112.

The adjustment module 312 adjusts the reference count requirement in response to an express directory 112 size meeting a predetermined threshold. The predetermined threshold may represent a directory size limit. For example, if the express directory 112 ever exceeds a 90% of 640 MB, then the adjustment module 312 increases the reference count requirement by one. This has the effect of rendering a greater number of block signatures unqualified for the express directory 112. In one embodiment, the adjustment module 312 expunges entries in the express directory 112 that do not meet the new reference count requirement. In some embodiments, the adjustment module 312 expunges entries in the express directory 112 until the express directory 112 size is below a secondary threshold. For example, the adjustment module 312 may expunge entries in the express directory 112 until the express directory 112 size is 85% of the maximum available memory for the express directory 112.

Figure 4:
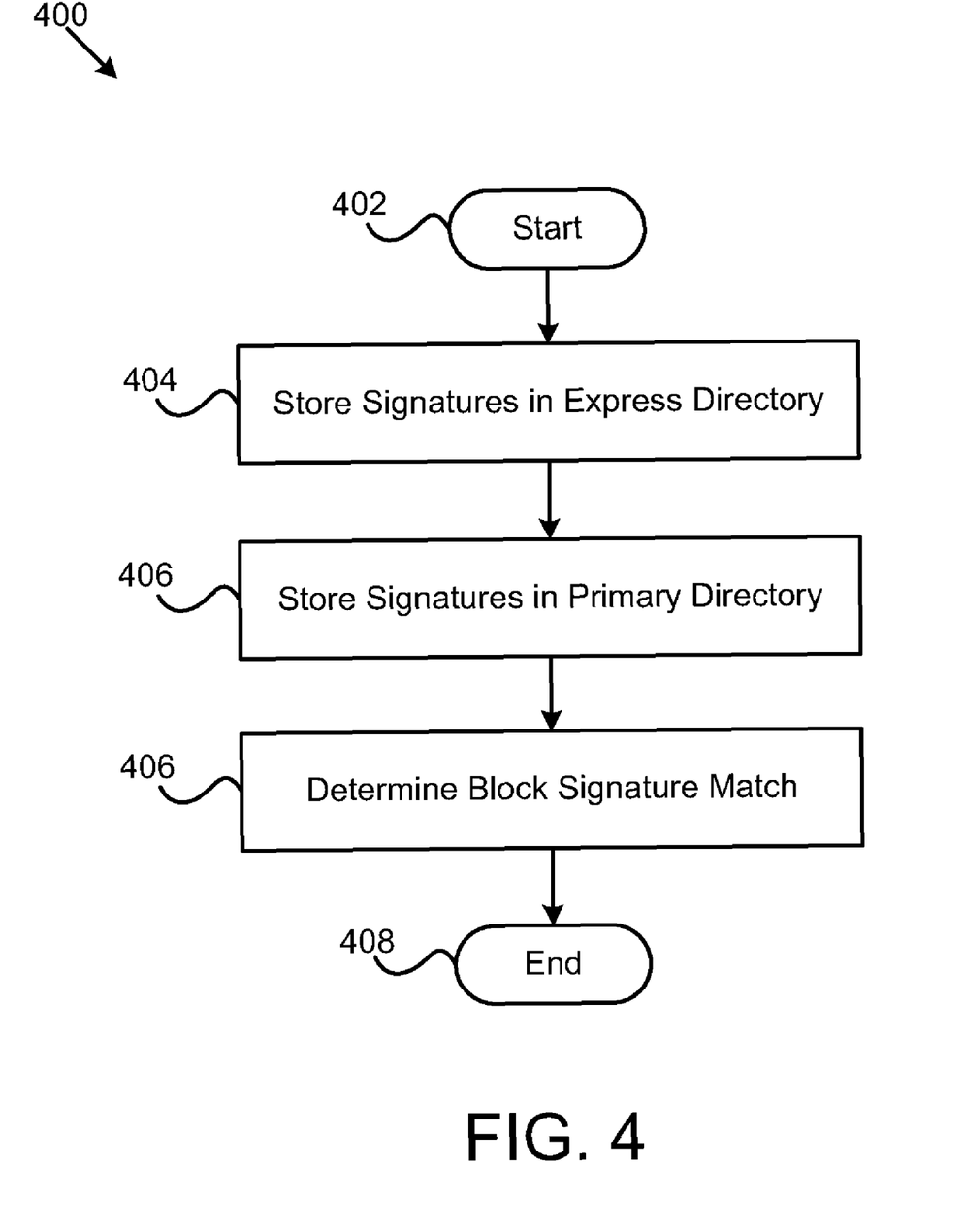
FIG. 4 is a schematic flow chart diagram illustrating one embodiment of a method for enhanced block-level deduplication in accordance with the present invention.

FIG. 4 illustrates one embodiment of a method 400 for enhanced block-level deduplication. The method 400 may be implemented by the executed operations of a computer program product comprising a computer readable storage medium having computer executable program code. The method 400 starts 402 when the express directory module 202 stores 404 one or more express block signatures in an express directory 112 that meet a reference count requirement. Next, the primary directory module 204 stores 406 one or more primary block signatures and the reference count for each primary block signature in a primary directory 114. The signature comparison module 208 then determines 406 whether a block signature for a data block matches one of the one or more express block signatures stored in the express directory 112 and the method 400 ends 408.

Figure 5:
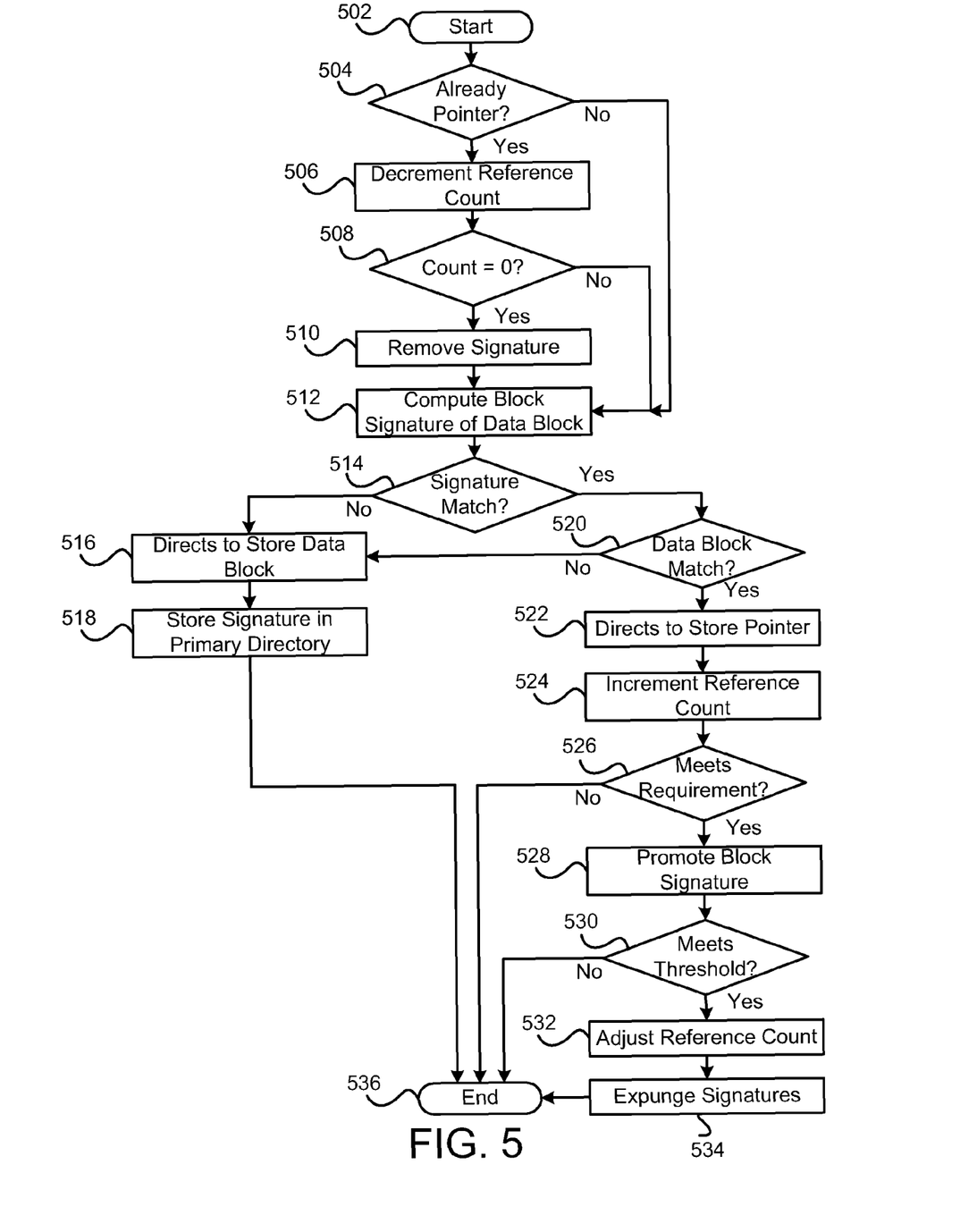
FIG. 5 is a detailed schematic flow chart diagram illustrating one embodiment of a method for enhanced block-level deduplication in accordance with the present invention.

FIG. 5 illustrates another embodiment of a method 500 for enhanced block-level deduplication. The method 500 may be implemented by the executed operations of a computer program product comprising a computer readable storage medium having computer executable program code. The method 500 starts 502 when the reference storage module 306 determines 504 if a data block received by the storage device 102 was previously stored as a pointer to a stored data block. Alternatively a combination of the block signature module 206, the reference storage module 306, and the block comparison module 304 may determine if data block was previously stored as a pointer. For example, the block signature module 206 may compute the block signature of the data block, the reference storage module 306 may determine if a data block with the same block signature is stored as a pointer, and the block comparison module 304 may make a detailed comparison to ensure that the data blocks match.

With block-level deduplication, the same data block can be re-written. If the data block was previously stored, the data block may be overlaid. However, if the data block was not stored and a pointer was stored instead and the reference count incremented, the reference count is decremented. Therefore, in one embodiment, the reference storage module 306 determines 504 that the data block was not stored as a pointer and the method 500 proceeds to step 512 described below.

Alternatively, the reference storage module 306 determines 504 that the data block was previously stored as pointer and the reference count module 308 decrements 506 the reference count. Next, the promotion module 310 determines 508 that the reference count for the data block does not equal zero and the method 500 proceeds to step 512 described below. Alternatively, the promotion module 310 determines 310 that the reference count equals zero and the promotion module 310 removes 510 the block signature from the express directory 112. Then, the block signature module 206 computes 512 a block signature of the data block as the data block is received by a storage device 102. The signature comparison module 208 determines 514 that the block signature for the data block fails to match any of the one or more express block signatures stored in the express directory 112. Therefore, the data block is not a duplicate of any data blocks represented in the express directory 112. The block storage module 302 then directs 516 the storage device 102 to store the data block. The primary directory module 204 then stores 518 the block signature as a primary block signature in the primary directory 114 and the method 500 ends 536.

Alternatively, the signature comparison module 208 determines 514 that the block signature for the data block matches one of the one or more express block signatures stored in the express directory 112. Therefore, the data block could be a duplicate of the data block represented by the block signature of the successful signature comparison. However, a detailed, bit by bit comparison is needed for verification. The block comparison module 304 then determines 520, using a bit by bit comparison, that the data block fails to match a stored data block associated with a matched express block signature. Consequently, the block storage module 302 then directs 522 the storage device 102 to store the data block in response to the data block failing to match the stored data block. The primary directory module 204 then stores 522 the block signature as a primary block signature in the primary directory 114 and the method 500 ends 536.

Alternatively, the block comparison module 304 uses a bit by bit comparison and determines 520 that the data block matches a stored data block associated with a matched express block signature. The reference storage module 306 then directs 522 the storage device 102 to store a pointer to the stored data block and the reference count module 308 increments 524 a reference count associated with a block signature corresponding to the stored data block. The reference count is incremented in the primary directory which maintains a record of the block signatures. The promotion module 310 determines 526 that the reference count associated with the block signature does not meet the reference count requirement and the method 500 ends 536.

Alternatively, the promotion module 310 determines 526 that the reference count associated with the block signature meets the reference count requirement and the promotion module 310 promotes 528 the block signature to the express directory 112. The adjustment module 312 determines 530 that the express directory 112 size does not meet a predetermined threshold, or maximum size and the method 500 ends 536.

Alternatively, the adjustment module 312 determines 530 that the express directory 112 size meets a predetermined threshold and the adjustment module 312 adjusts 532 the reference count requirement by raising the reference count requirement by one. The adjustment module 312 then expunges 534 the express directory 112 by eliminating express signatures that fail to meet the adjusted reference count requirement until the express directory 112 size reaches a secondary threshold. The method 500 then ends 536.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable storage medium having computer usable program code executable by a processor to perform operations for enhanced block-level deduplication, the operations comprising:
    storing one or more express block signatures in an express directory, the one or more express block signatures comprising block signatures for data blocks meeting a reference count requirement, the one or more express block signatures corresponding to one or more data blocks received by a storage device, the reference count requirement comprising a minimum number of references to a particular data block for inclusion of a block signature for the particular data block in the express directory;
    storing one or more primary block signatures and one or more reference counts for the primary block signatures in a primary directory, the one or more primary block signatures corresponding to the one or more data blocks, the primary block signatures comprising block signatures having a reference count below the reference count requirement, the primary directory distinct from the express directory; and
    determining whether a block signature for a data block matches one of the one or more express block signatures stored in the express directory as the data block is received by a storage device.

2. The computer program product of claim 1, further comprising directing the storage device to store the data block in response to the block signature failing to match the one or more express block signatures stored in the express directory.

3. The computer program product of claim 2, further comprising determining whether the data block matches a stored data block associated with a matched express block signature in response to the block signature matching one of the one or more express block signatures.

4. The computer program product of claim 3, further comprising:
    directing the storage device to store a pointer to the stored data block in response to the data block matching the stored data block; and
    incrementing a reference count associated with a block signature corresponding to the stored data block.

5. The computer program product of claim 3, further comprising directing the storage device to store the data block in response to the data block failing to match the stored data block.

6. The computer program product of claim 1, further comprising promoting a block signature stored in the primary directory to the express directory in response to a reference count associated with the block signature meeting the reference count requirement.

7. The computer program product of claim 1, further comprising computing the block signature of the data block as the data block is received by the storage device.

8. The computer program product of claim 1, wherein storing one or more express block signatures in an express directory further comprises adjusting the reference count requirement in response to an express directory size meeting a predetermined threshold.

9. An apparatus for enhanced block-level deduplication, the apparatus comprising:
    a processor;
    a memory in communication with the processor;
    an express directory module configured to store one or more express block signatures in an express directory, the one or more express block signatures comprising block signatures for data blocks meeting a reference count requirement, the one or more express block signatures corresponding to one or more data blocks received by a storage device, the reference count requirement comprising a minimum number of references to a particular data block for inclusion of a block signature for the particular data block in the express directory;
    a primary directory module configured to store one or more primary block signatures and one or more reference counts for the primary block signatures in a primary directory, the one or more primary block signatures corresponding to the one or more data blocks, the primary block signatures comprising block signatures having a reference count below the reference count requirement, the primary directory distinct from the express directory;
    a block signature module configured to compute a block signature of a data block as the data block is received by a storage device; and
    a signature comparison module configured to determine whether the block signature for the data block matches one of the one or more express block signatures stored in the express directory.

10. The apparatus of claim 9, further comprising a block storage module configured to direct the storage device to store the data block in response to the block signature failing to match the one or more express block signatures stored in the express directory.

11. The apparatus of claim 10, further comprising a block comparison module configured to determine whether the data block matches a stored data block associated with a matched express block signature in response to the block signature matching one of the one or more express block signatures.

12. The apparatus of claim 11, further comprising:
    a reference storage module configured to direct the storage device to store a pointer to the stored data block in response to the data block matching the stored data block;

a reference count module configured to increment a reference count associated with a block signature corresponding to the stored data block.

13. The apparatus of claim 11, wherein the block storage module is further configured to direct the storage device to store the data block in response to the data block failing to match the stored data block.

14. The apparatus of claim 9, further comprising a promotion module configured to promote a block signature stored in the primary directory to the express directory in response to a reference count associated with the block signature meeting the reference count requirement.

15. The apparatus of claim 9, wherein the express directory module further comprises an adjustment module configured to adjust the reference count requirement in response to an express directory size meeting a predetermined threshold.

16. A method for enhanced block-level deduplication, the method comprising:
storing one or more express block signatures in an express directory, the one or more express block signatures comprising block signatures for data blocks meeting a reference count requirement, the one or more express block signatures corresponding to one or more data blocks received by a storage device, the reference count requirement comprising a minimum number of references to a particular data block for inclusion of a block signature for the particular data block in the express directory, the express directory implemented on memory;
storing one or more primary block signatures and one or more reference counts for the primary block signatures in a primary directory, the one or more primary block signatures corresponding to the one or more data blocks, the primary block signatures comprising block signatures having a reference count below the reference count requirement, the primary directory distinct from the express directory;
computing the block signature of the data block as the data block is received by a storage device before the data block is written to a storage disk of the storage device so long as resource usage of the storage device is below a resource threshold; and
determining by a computer whether a block signature for a data block matches one of the one or more express block signatures stored in the express directory.

17. The method of claim 16, further comprising directing the storage device to store the data block in response to the block signature failing to match the one or more express block signatures stored in the express directory.

18. The method of claim 16, further comprising determining whether the data block matches a stored data block associated with a matched express block signature in response to the block signature matching one of the one or more express block signatures.

19. The method of claim 18, further comprising:
directing the storage device to store a pointer to the stored data block in response to the data block matching the stored data block;
incrementing a reference count associated with a block signature corresponding to the stored data block.

20. The method of claim 16, further comprising promoting a block signature stored in the primary directory to the express directory in response to a reference count associated with the block signature meeting the reference count requirement.

* * * * *